US008421781B2

(12) United States Patent
Chen et al.

(10) Patent No.: US 8,421,781 B2
(45) Date of Patent: Apr. 16, 2013

(54) SHIFT REGISTER CAPABLE OF REDUCING COUPLING EFFECT

(75) Inventors: Yung-Chih Chen, Hsin-Chu (TW); Chun-Hsin Liu, Hsin-Chu (TW); Tsung-Ting Tsai, Hsin-Chu (TW); Kuo-Chang Su, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 718 days.

(21) Appl. No.: 12/636,801

(22) Filed: Dec. 14, 2009

(65) Prior Publication Data

US 2010/0245298 A1 Sep. 30, 2010

(30) Foreign Application Priority Data

Mar. 24, 2009 (TW) ............................... 98109616 A

(51) Int. Cl.
*G06F 3/038* (2006.01)

(52) U.S. Cl.
USPC ........................................... 345/204; 345/100

(58) Field of Classification Search .................... 345/42, 345/76, 78, 80, 82, 100, 206, 90, 212; 377/64–81, 377/112–113
See application file for complete search history.

(56) References Cited

U.S. PATENT DOCUMENTS

| | | | | |
|---|---|---|---|---|
| 6,064,713 | A * | 5/2000 | Lebrun et al. | 377/67 |
| 6,690,347 | B2 | 2/2004 | Jeon | |
| 7,310,402 | B2 * | 12/2007 | Wei et al. | 377/64 |
| 7,443,943 | B2 * | 10/2008 | Kim et al. | 377/64 |
| 2008/0068358 | A1 * | 3/2008 | Lee et al. | 345/204 |

* cited by examiner

*Primary Examiner* — Joseph Haley
*Assistant Examiner* — Andrew Sasinowski
(74) *Attorney, Agent, or Firm* — Winston Hsu; Scott Margo

(57) ABSTRACT

A shift register has a plurality of shift register units coupled in series. Each shift register includes a pull-up circuit, an input circuit, a pull-down circuit, a compensation circuit, an input end, an output end and a node. Each shift register unit receives an input voltage at the input end and provides an output voltage at the output end. The input circuit transmits the input voltage to the node based on a first clock signal. The pull-up circuit provides the output voltage based on a second clock signal and the voltage level of the node. The pull-down circuit selectively connects the node with the output end according to a third clock signal. The compensation circuit is coupled to the input circuit, the pull-down circuit and the node for maintaining the voltage level of the node based on the second and third clock signals.

21 Claims, 13 Drawing Sheets

SHIFT REGISTER CAPABLE OF REDUCING COUPLING EFFECT

BACKGROUND OF THE INVENTION

1. Field of the Invention

The present invention is related to a shift register, and more particularly, to a shift register capable of reducing coupling effect.

2. Description of the Prior Art

Liquid crystal display (LCD) devices, characterized in low radiation, small size and low power consumption, have gradually replaced traditional cathode ray tube (CRT) display devices and been widely used in electronic devices, such as notebook computers, personal digital assistants (PDAs) or mobile phones. Traditional LCD devices display images by driving the pixels of the panel using external driving chips. In order to reduce the number of devices and to lower manufacturing cost, gate on array (GOA) technique has been developed in which the driving circuits are directly fabricated on the panel.

Reference is made to FIG. 1 for a simplified block diagram illustrating a prior art LCD device 100. FIG. 1 only shows partial structure of the LCD device 100, including a plurality of gate lines GL(1)-GL(N), a shift register 110, a clock generator 120 and a power supply 130. The clock generator 120 can provide a start pulse signal VST and two clock signals CLK1 and CLK2 for operating the shift register 110. The power supply 130 can provide bias voltages VDD and VSS for operating the shift register 110. The shift register 110 includes a plurality of shift register units SR(1)-SR(N) coupled in series and having output ends respectively coupled to the corresponding gate lines GL(1)-GL(N). According to the clock signals CLK1, CLK2 and the start pulse signal VST, the shift register 110 can sequentially output gate driving signals GS(1)-GS(N) to the corresponding gate lines GL(1)-GL(N) via the shift register units SR(1)-SR(N), respectively.

Reference is made to FIG. 2 for a diagram illustrating an nth-stage shift register unit SR(n) among the prior art shift register units SR(1)-SR(N), wherein n is an integer between 1 and N. The nth-stage shift register unit SR(n) includes an input end IN(n), an output end OUT(n), an input circuit 10, a pull-up circuit 20, two pull-down circuits 30 and 34, and a holding circuit 40. The input end IN(n) of the shift register unit SR(n) is coupled to the output end OUT(n−1) of a prior-stage shift register unit SR(n−1), and the output end OUT(n) of the shift register unit SR(n) is coupled to the input end IN(n+1) of a next-stage shift register unit SR(n+1).

The input circuit 10 includes a transistor switch T1 having a gate and a drain coupled to the input end IN(n) and a source coupled to a node Q(n). The input circuit 10 can thus control the signal transmission path between the input end IN(n) and the node Q(n) according to the gate driving signal GS(n−1). The pull-up circuit 20 includes a transistor switch T2 having a gate coupled to the node Q(n), a drain coupled to the clock generator 120 for receiving the clock signal CLK1, and a source coupled to the output end OUT(n). The pull-up circuit 20 can thus control the signal transmission path between the clock signal CLK1 and the output end OUT(n) according to the voltage level of the node Q(n).

The pull-down circuit 30 includes transistor switches T3-T6. The transistor switches T3 and T4 coupled in series respectively receive the clock signals CLK1 and CLK2 having opposite phases at corresponding gates, and can thus provide control signals at the gates of the transistor switches T5 and T6 accordingly. Therefore, the transistor switch T5 can control the signal transmission path between the node Q(n) and the bias voltage VSS according to its gate voltage, while the transistor switch T6 can control the signal transmission path between the output end OUT (n) and the bias voltage VSS according to its gate voltage. The pull-down circuit 34 includes transistor switches T7-T10. The transistor switches T7 and T8 coupled in series respectively receive the clock signals CLK1 and CLK2 having opposite at the gates of the transistor switches T9 and T10 accordingly. Therefore, the transistor switch T9 can control the signal transmission path between the node Q(n) and the bias voltage VSS according to its gate voltage, while the transistor switch T10 can control the signal transmission path between the output end OUT(n) and the bias voltage VSS according to its gate voltage.

The holding circuit 40 includes transistor switches T11-T13. The transistor switch T11 having a gate coupled to the output end OUT(n) can maintain the gates of the transistor switches T5 and T6 at the low level bias voltage VSS when the gate driving signal GS(n) is at high level. The transistor switch T12 having a gate coupled to the input end IN(n) can maintain the gates of the transistor switches T9 and T10 at the low level bias voltage VSS when the gate driving signal GS(n−1) is at high level. The transistor switch T13 having a gate coupled to the output end OUT(n) can maintain the gates of the transistor switches T9 and T10 at the low level bias voltage VSS when the gate driving signal GS(n) is at high level.

Reference is made to FIG. 3 for a timing diagram illustrating the operation of the prior art LCD device 100. In the prior art LCD device 100, the duty cycles of the clock signals CLK1 and CLK2 are both ½ and the clock signals CLK1 and CLK2 have opposite phases. The first-stage shift register unit SR(1) generates the first-stage gate driving signal GS(1) according to the start pulse signal VST, and the second- to Nth-stage shift register units SR(2)-SR(N) generate the second- to Nth-stage gate driving signals GS(2)-GS(N) according to the output signals of the corresponding prior-stage shift registers (FIG. 3 only shows the gate driving signals GS(1), GS(n−1) and GS(n)). In other words, the gate driving signals GS(1)-GS(N−1) are provided for enabling the shift register units SR(2)-SR(N), respectively.

The prior art LCD device 100 performs pull-up operations between t1 and t3, and performs pull-down operations after t3. Between t1 and t2, the clock signal CLK1 is at low level, while the clock signal CLK2 and the gate driving signal GS(n−1) are at high level. The transistor switch T1 is thus turned on and the node Q(n) is pulled up to a high level VDD, thereby turning on the transistor switch T2. At t2, the clock signal CLK1 switches from low level to high level, thereby turning on the transistor switch T2 for providing the gate driving signal GS(n) with high level between t2 and t3 (when the clock signal CLK1 is at high level). On the other hand, the pull-down circuits 30 and 40 operate in a complementary manner and each performs 50% of the pull-down operations. Between t3 and t4, the clock signal CLK1 is at low level, the clock signal CLK2 is at high level, and the input and output signals of the shift register unit SR(N) (the gate driving signals GS(n−1) and GS(n)) are both at low level. The gates of the transistor switches T5 and T6 are substantially maintained at a low level VSS, and the gates of the transistor switches T9 and T10 are substantially maintained at the high level VDD. Similarly, between t4 and t5, the clock signal CLK1 is at high level, the clock signal CLK2 is at low level, and the output signal of the shift register unit SR (N) (the gate driving signal GS (n)) is at low level. The gates of the transistor switches T5 and T6 are substantially maintained at the high level VDD, and the gates of the transistor switches T9 and T10 are substantially maintained at the low level VSS. For the nth-stage shift register unit SR(n), the voltage level of the node Q(n) needs to change between t1 and t2, but is required to stably remain at low level during other periods. In the ideal case, the transistor switch T2 can be completely turned off, so that the clock signal CLK1 does not influence the voltage level of the node Q(n). However in the actual situation, the clock signal CLK1 may be coupled to the node Q(n) via the parasite capacitance of the transistor switch T2. The performance of the LCD device 100 is influenced since the voltage level of the node Q(n) may fluctuate with the clock signal CLK1, such as at t4, t4 and t6.

SUMMARY OF THE INVENTION

The present invention provides a shift register comprising a plurality of shift register units coupled in series. Each shift register unit comprises an input end for receiving an input voltage; an output end for outputting an output voltage; a node; a pull-up circuit for providing the output voltage at the output end according to a first clock signal and a voltage level of the node; an input circuit for transmitting the input voltage to the node; a first pull-down circuit for selectively connecting the node with the output end according to a second clock signal; and a compensation circuit coupled to the input circuit, the first pull-down circuit and the node for maintaining the voltage level of the node according to the second or a third clock signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
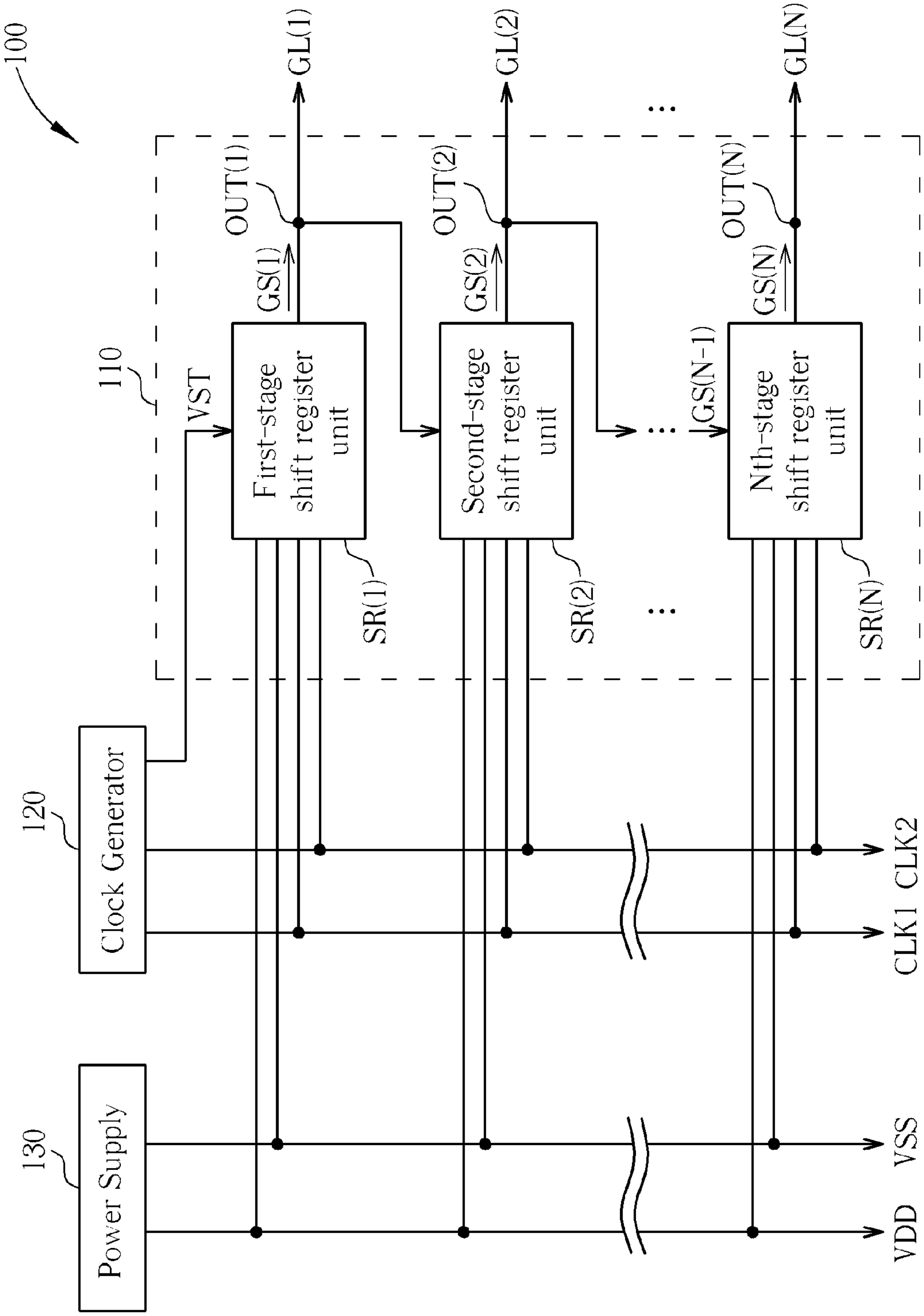
FIG. 1 PRIOR ART
FIG. 1 is a simplified block diagram illustrating a prior art LCD device.
Figure 2:
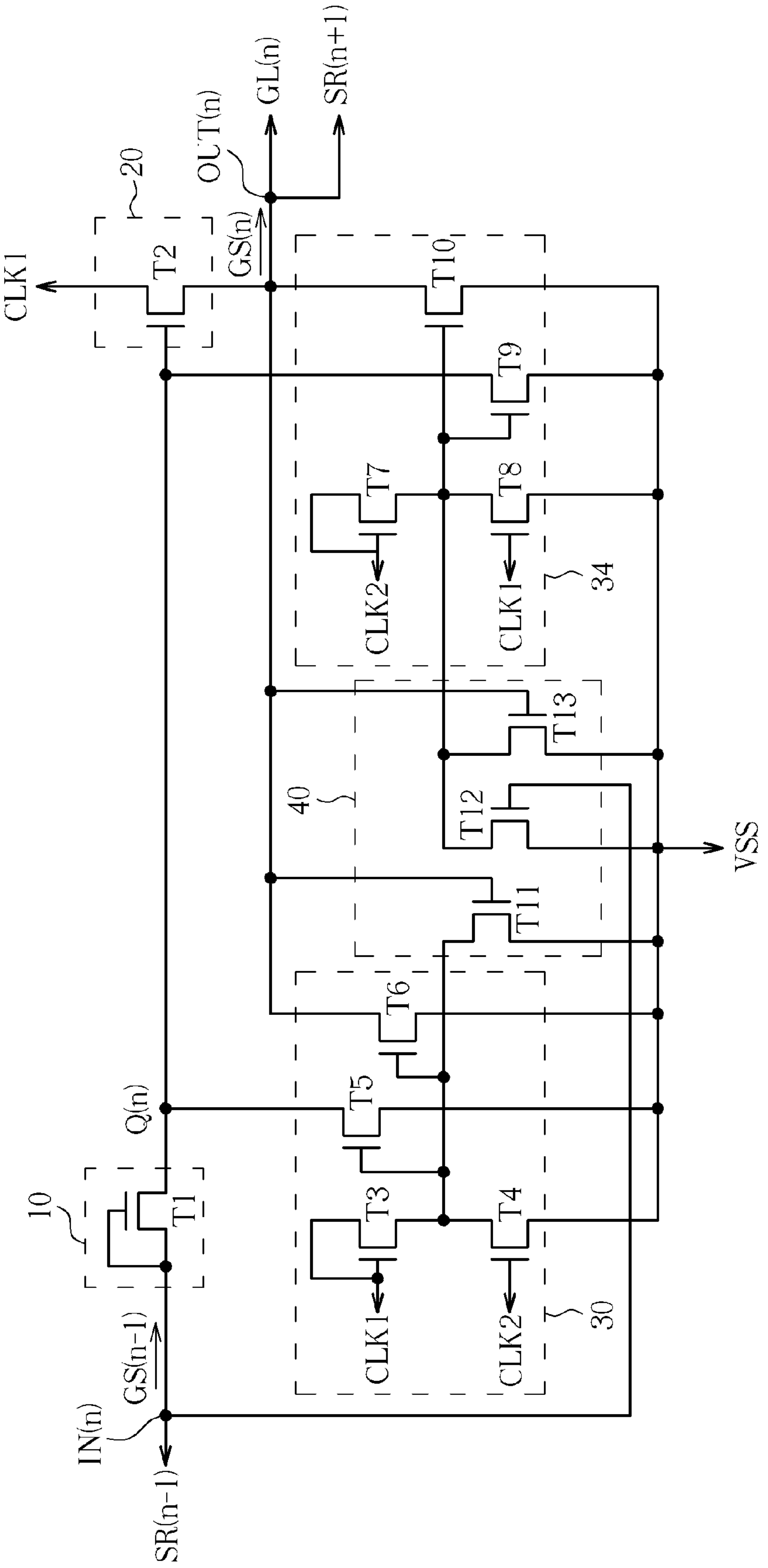
FIG. 2 PRIOR ART
FIG. 2 is a diagram illustrating an nth-stage shift register unit in the prior art LCD device.
Figure 3:
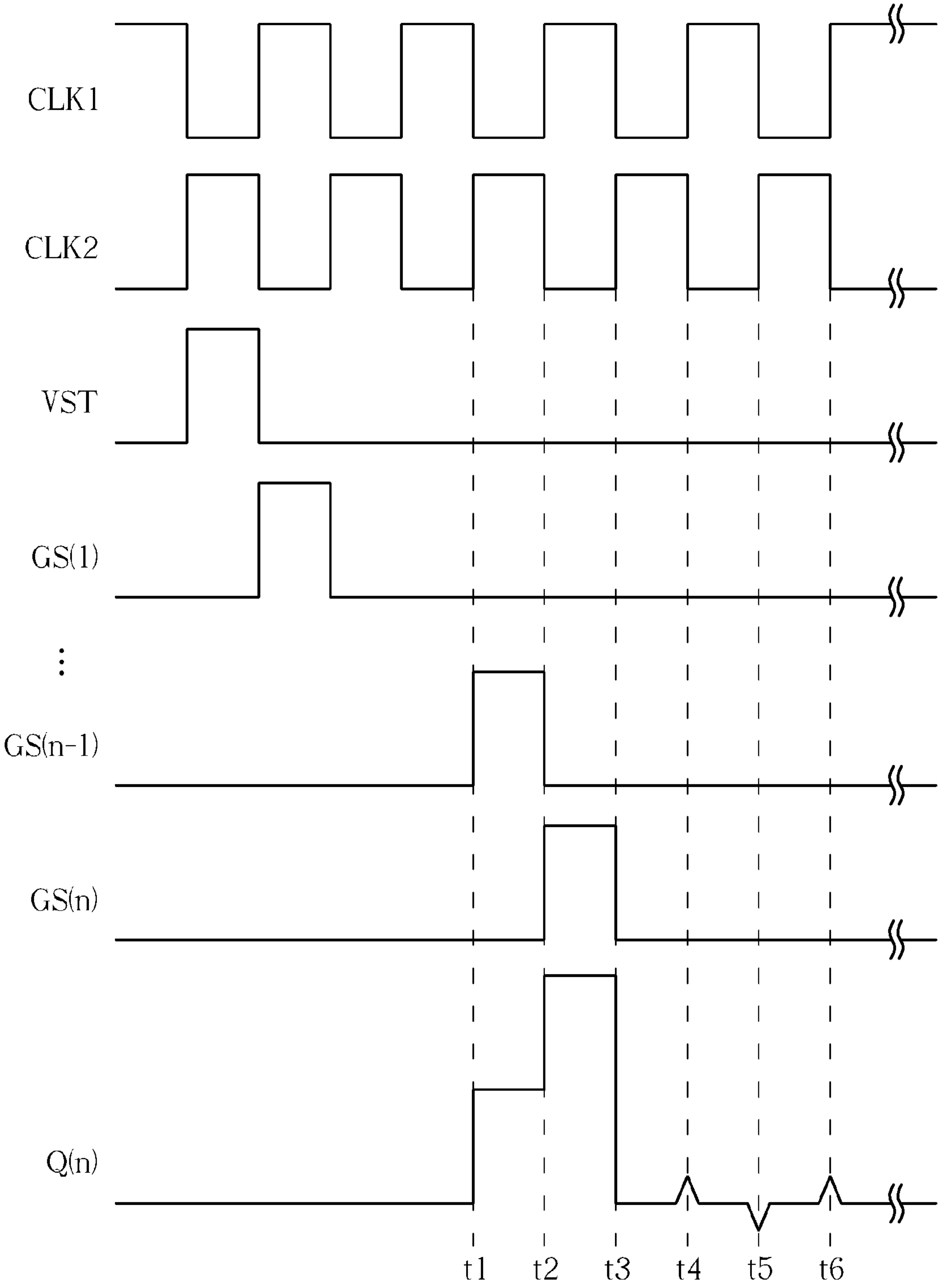
FIG. 3 PRIOR ART
FIG. 3 is a timing diagram illustrating the operation of the prior art LCD device.
Figure 4:
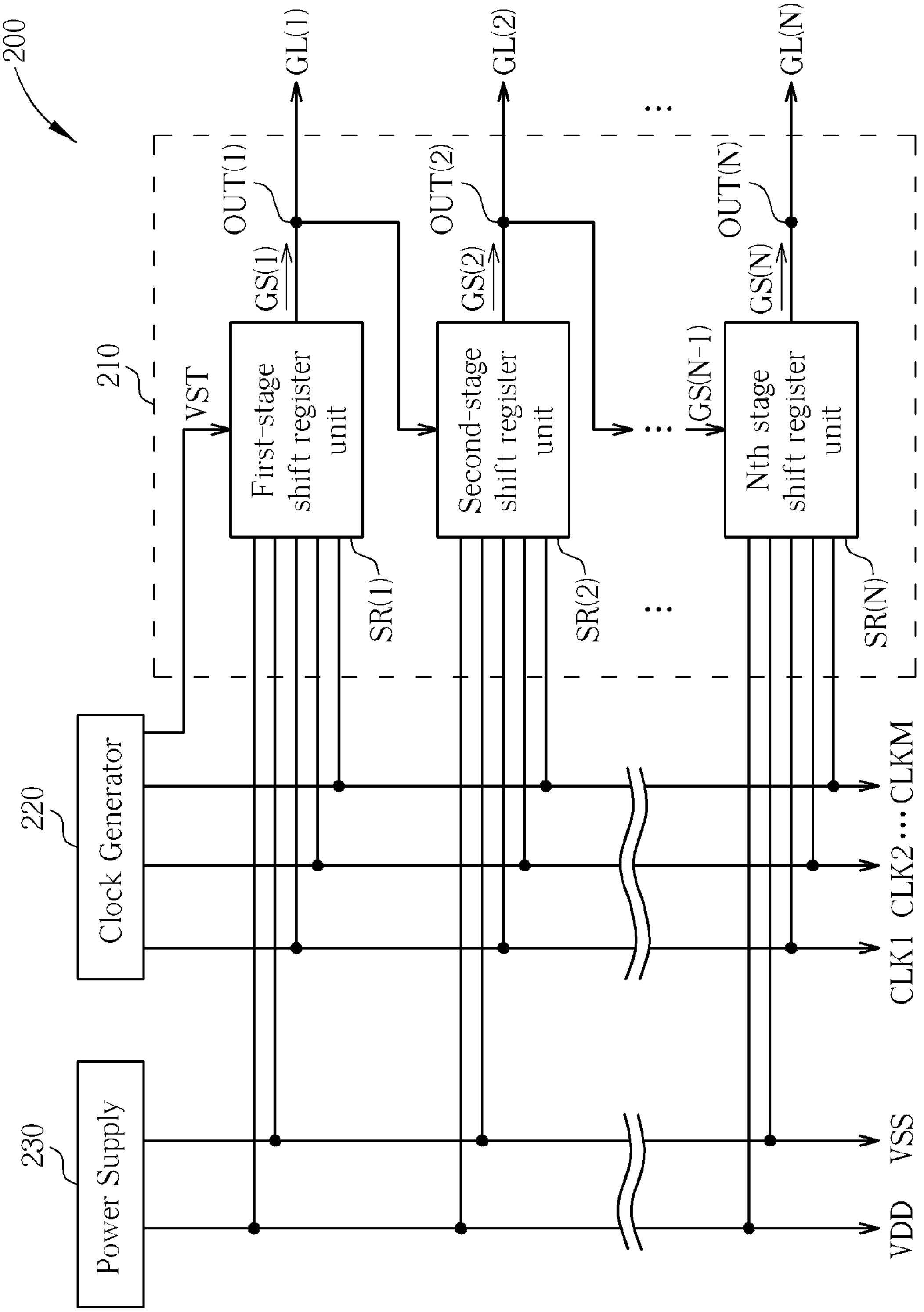
FIG. 4 is a simplified block diagram illustrating an LCD device according to the present invention.

Reference is made to FIG. 4 for a simplified block diagram illustrating an LCD device 200 according to the present invention. FIG. 4 shows partial structure of the LCD device 200, including a plurality of gate lines GL(1)-GL(N), a shift register 210, a clock generator 220 and a power supply 230. The clock generator 220 can provide a start pulse signal VST and a plurality of clock signals CLK1-CLKM for operating the shift register 210. The power supply 230 can provide bias voltages VDD and VSS for operating the shift register 210. The shift register 210 includes a plurality of shift register units SR(1)-SR(N) coupled in series and having output ends respectively coupled to the corresponding gate lines GL(1)-GL(N). According to the clock signals CLK1-CLKM and the start pulse signal VST, the shift register 210 can sequentially output gate driving signals GS(1)-GS(N) to the corresponding gate lines GL(1)-GL(N) via the shift register units SR(1)-SR(N), respectively. The shift register unit SR(1) generates the first-stage gate driving signal GS(1) according to the start pulse signal VST, while the second- to Nth-stage shift register units SR(2)-SR(N) generate the second- to Nth-stage gate driving signals GS(2)-GS(N) according to signals generated by the corresponding prior-stage shift registers SR(1)-SR(N−1), respectively.

Figure 5:
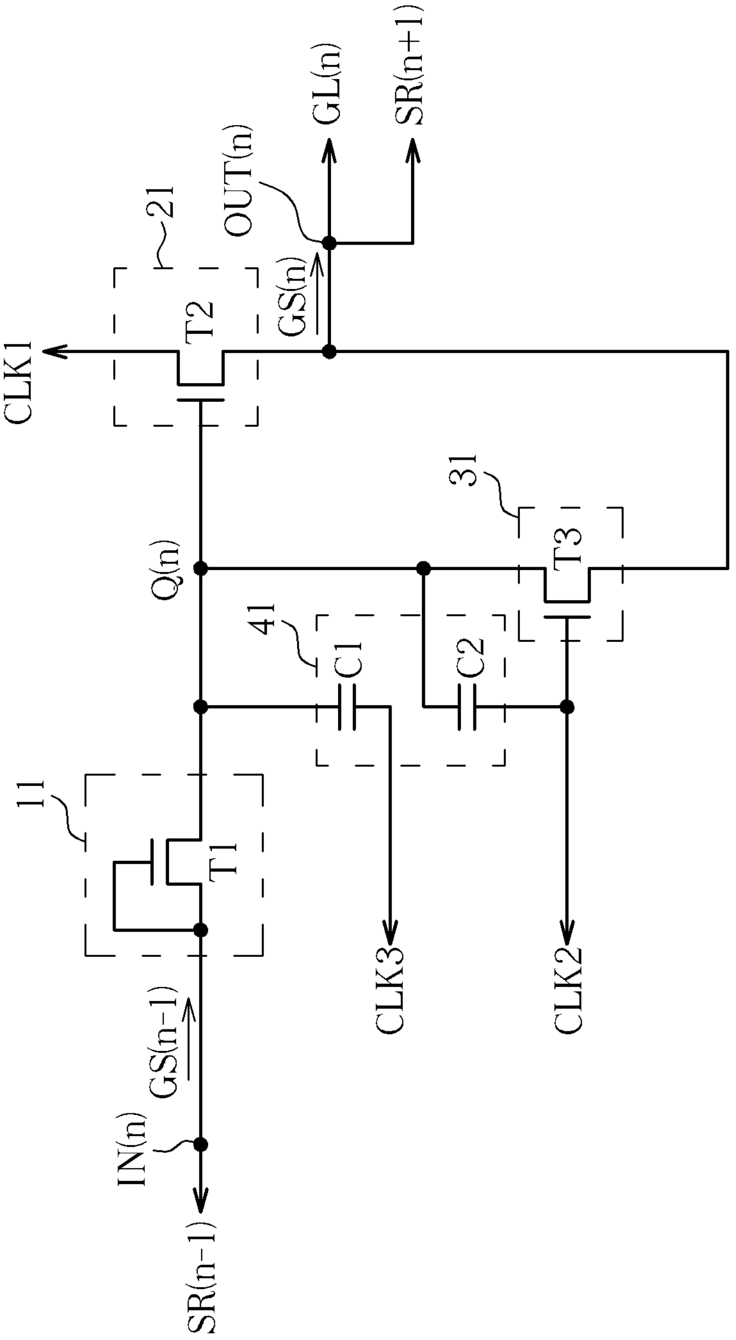
FIG. 5 is a diagram illustrating an nth-stage shift register unit according to a first embodiment of the present invention.

Reference is made to FIG. 5 for a diagram illustrating an nth-stage shift register unit SR(n) according to a first embodiment of the present invention. The shift register unit SR(n) includes an input end IN(n), an output end OUT(n), an input circuit 11, a pull-up circuit 21, a pull-down circuit 31, and a compensation circuit 41. The input end IN(n) of the shift register unit SR(n) is coupled to the output end OUT(n−1) of a prior-stage shift register unit SR(n−1), and the output end OUT(n) of the shift register unit SR(n) is coupled to the input end IN(n+1) of a next-stage shift register unit SR(n+1). Three clock signals CLK1-CLK3 are used in the first embodiment of the present invention for driving each shift register unit.

The input circuit 11 includes a transistor switch T1 having a gate and a drain coupled to the input end IN(n) and a source coupled to a node Q(n). The input circuit 11 can thus control the signal transmission path between the input end IN(n) and the node Q(n) according to the gate driving signal GS(n−1). The pull-up circuit 21 includes a transistor switch T2 having a gate coupled to the node Q(n), a drain coupled to the clock generator 220 for receiving the clock signal CLK1, and a source coupled to the output end OUT(n). The pull-up circuit 21 can thus control the signal transmission path between the clock signal CLK1 and the output end OUT(n) according to the voltage level of the node Q(n). The pull-down circuit 31 includes a transistor switch T3 having a gate coupled to the clock generator 220 for receiving the clock signal CLK2, a drain coupled to the node Q(n), and a source coupled to the output end OUT(n) of the shift register unit SR(n). The pull-down circuit 31 can thus control the signal transmission path between the output end OUT(n) of the shift register unit SR(n) and the node Q(n) according to the clock signal CLK2. The compensation circuit 41, including two capacitors C1 and C2, is coupled to the input circuit 11, the pull-down circuit 31 and the node Q(n). The capacitor C1, coupled between the clock generator 220 and the node Q(n), can maintain the voltage level of the node Q(n) according to the clock signal CLK3. The capacitor C2, coupled between the transistor switch T3 and the node Q(n), can maintain the voltage level of the node Q(n) according to the clock signal CLK2.

Figure 6:
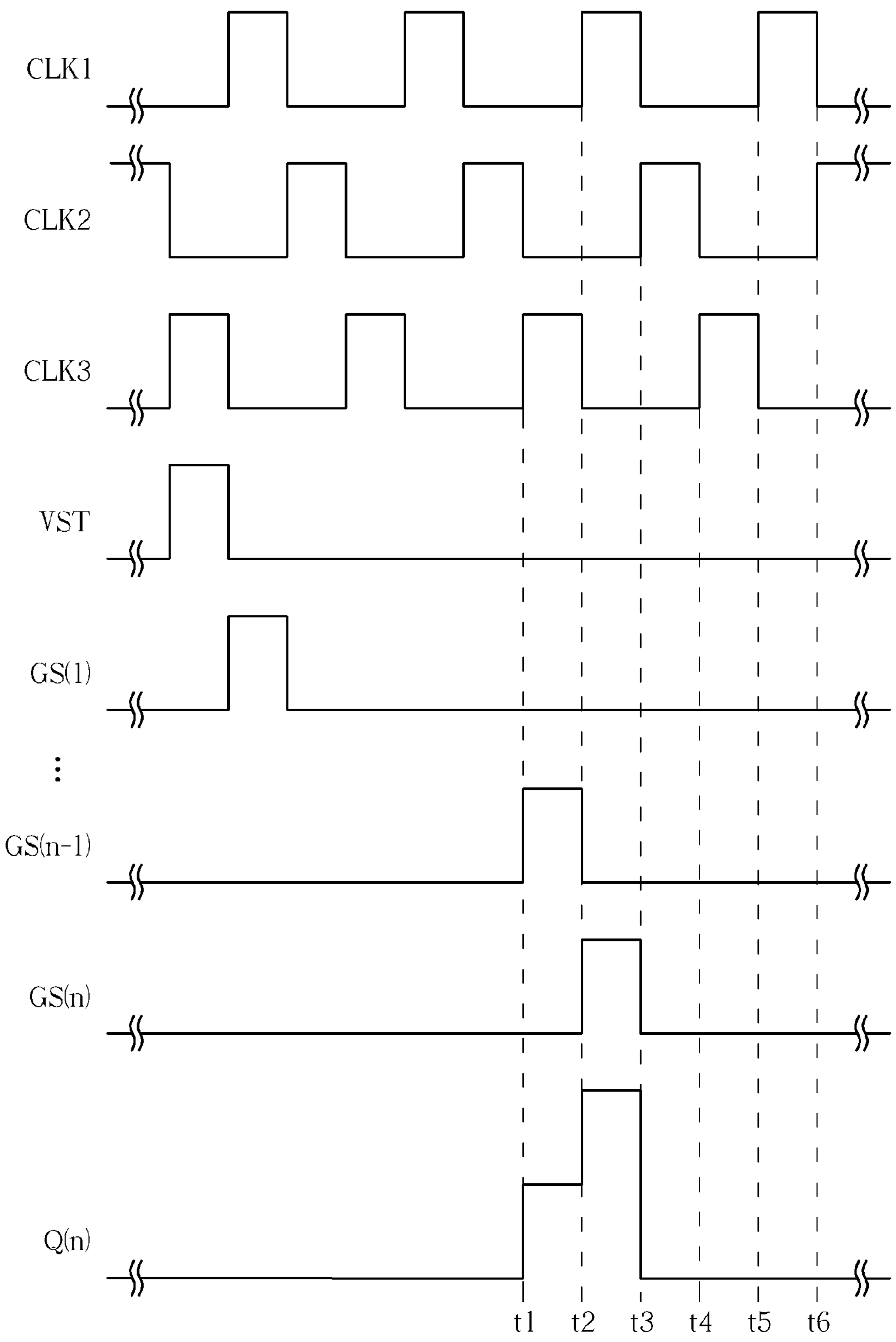
FIG. 6 is a timing diagram illustrating the operation of the LCD device according to the present invention.

Reference is made to FIG. 6 for a timing diagram illustrating the operation of the LCD device 200 according to the first embodiment of the present invention. In the LCD device 200, three clock signals CLK1-CLK3 are used for driving each shift register unit. The duty cycles of the clock signals CLK1-CLK3 do not exceed ⅓. Each of the clock signals CLK1-

CLK3 and the start pulse signal VST remain at high level for the same length of time in each period. The first-stage shift register unit SR(1) generates the first-stage gate driving signal GS(1) according to the start pulse signal VST, and the second- to Nth-stage shift register units SR(2)-SR(N) generate the second- to Nth-stage gate driving signals GS(2)-GS(N) according to the output signals of the corresponding prior-stage shift registers (FIG. 6 only shows the gate driving signals GS(1), GS(n−1) and GS(n)). In other words, the gate driving signals GS(1)-GS(N−1) are provided for enabling the shift register units SR(2)-SR(N), respectively.

The LCD device 200 of the present invention performs pull-up operations when the clock signal CLK1 or CLK3 is at high level. For example, between t1 and t2, the clock signals CLK1 and CLK2 are at low level, while the clock signal CLK3 and the gate driving signal GS(n−1) are at high level. The transistor switch T1 is thus turned on and the node Q(n) is pulled up to a high level VDD, thereby turning on the transistor switch T2. At t2, the clock signal CLK1 switches from low level to high level, and the node Q(n) is pulled up by the parasite capacitance of the transistor switch T2, thereby turning on the transistor switch T2. Therefore, the gate driving signal GS(n) with high level can be provided between t2 and t3 (when the clock signal CLK1 is at high level).

The LCD device 200 of the present invention performs pull-down operations when the clock signal CLK2 is at high level. For example, between t3 and t4, the clock signals CLK1 and CLK3 are at low level and the clock signal CLK2 is at high level, thereby turning off the transistor switch T1 and turning on the transistor switch T3. Therefore, the voltage levels of the node Q(n) and the output end OUT(n) are both kept at low level. After completing the pull-down operations, the present invention uses the compensation circuit 41 to offset the fluctuations of the node Q(n) caused by the variations in the clock signals, so that the node Q(n) can be stably maintained at low level. For example, at t4 when the clock signal CLK2 switches from high level to low level and the clock signal CLK3 switches from low level to high level, the capacitors C1 and C2 can compensate the voltage fluctuations at the node Q(n); at t5 when the clock signal CLK1 switches from low level to high level and the clock signal CLK3 switches from high level to low level, the capacitor C1 can compensate the voltage fluctuations at the node Q(n); at t6 when the clock signal CLK1 switches from high level to low level and the clock signal CLK2 switches from low level to high level, the capacitor C2 can compensate the voltage fluctuations at the node Q(n).

Figure 7:
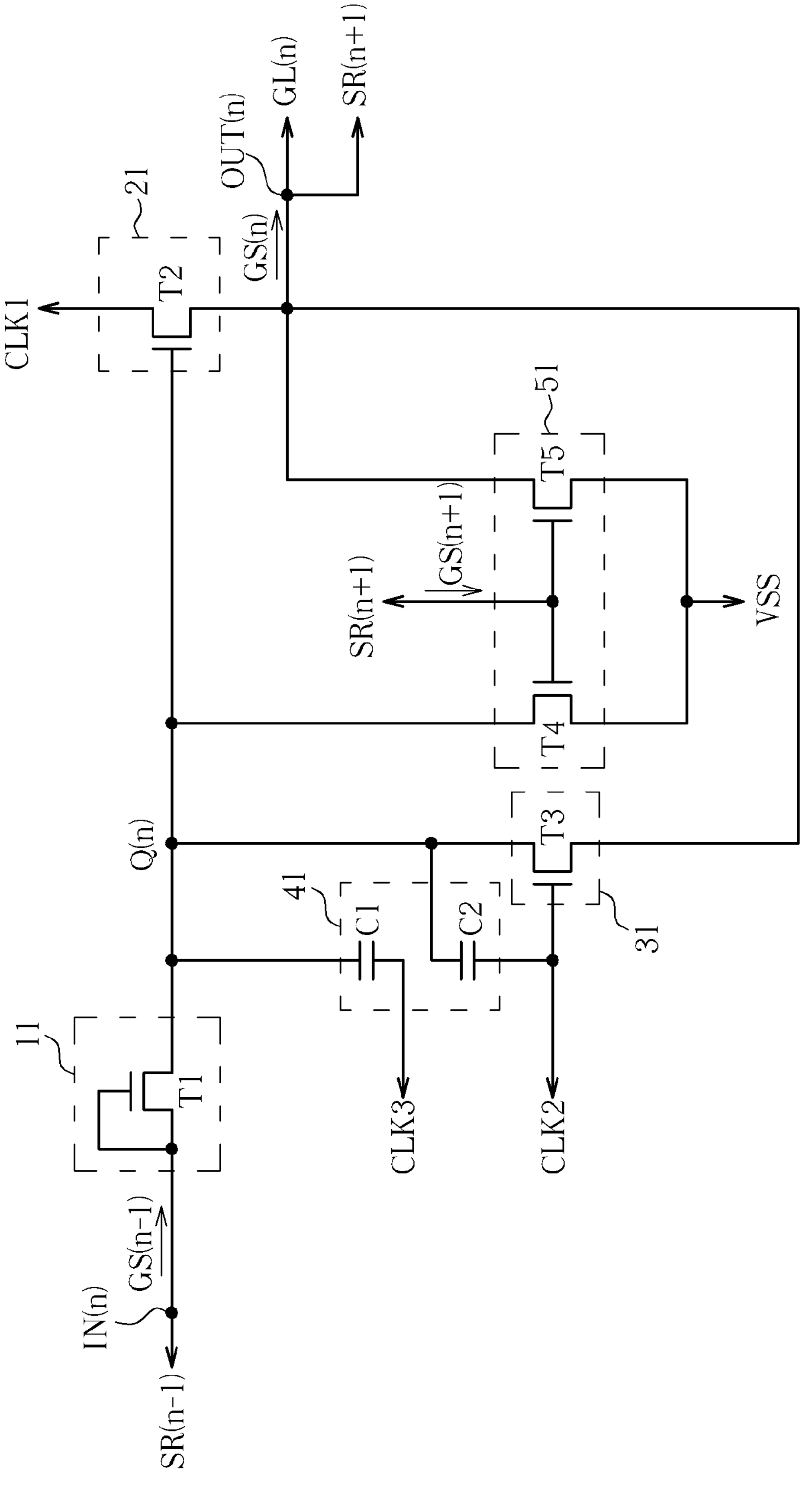
FIG. 7 is a diagram illustrating an nth-stage shift register unit according to a second embodiment of the present invention.

Reference is made to FIG. 7 for a diagram illustrating an nth-stage shift register unit SR(n) according to a second embodiment of the present invention. In the second embodiment of the present invention, the shift register unit SR(n) includes an input end IN(n), an output end OUT(n), an input circuit 11, a pull-up circuit 21, a pull-down circuit 31, a compensation circuit 41 and a pre-pull-down circuit 51. The first and second embodiments of the present invention have similar structures, but the shift register unit SR(n) of the second embodiment further includes the pre-pull-down circuit 51. The pre-pull-down circuit 51 includes transistor switches T4 and T5. The transistor switch T4, having a gate coupled to the output end OUT(n+1) of the next-stage shift register unit SR(n+1) for receiving the gate driving signal GS(n+1), a drain coupled to the node Q(n) and a source coupled to the low level bias voltage VSS, can control the signal transmission path between the low level bias voltage VSS and the node Q(n) according to the gate driving signal GS(n+1). The transistor switch T5, having a gate coupled to the output end OUT(n+1) of the next-stage shift register unit SR(n+1) for receiving the gate driving signal GS(n+1), a drain coupled to the output end OUT(n) and a source coupled to the low level bias voltage VSS, can control the signal transmission path between the low level bias voltage VSS and the output end OUT(n) according to the gate driving signal GS(n+1). The operation of the second embodiment can also be illustrated by the timing diagram in FIG. 6. Meanwhile, the second embodiment of the present invention further maintains the voltage levels of the node Q(n) and the output end OUT(n) using the compensation circuit 51, such as maintaining the voltage levels of the node Q(n) and the output end OUT (n) at the low level VSS when the gate driving signal GS(n+1) is at high level.

Figure 8:
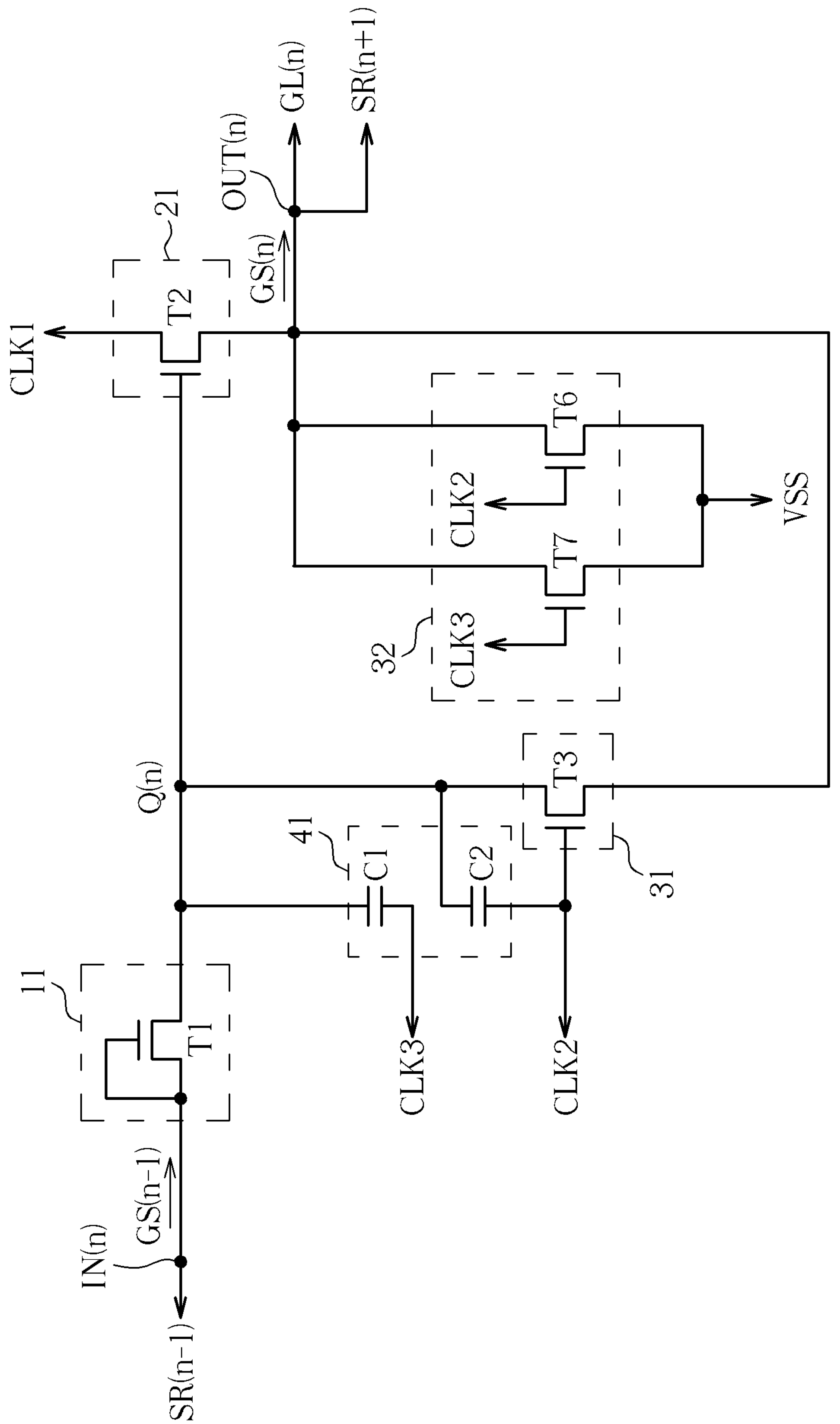
FIG. 8 is a diagram illustrating an nth-stage shift register unit according to a third embodiment of the present invention.

Reference is made to FIG. 8 for a diagram illustrating an nth-stage shift register unit SR(n) according to a third embodiment of the present invention. In the third embodiment of the present invention, the shift register unit SR(n) includes an input end IN(n), an output end OUT(n), an input circuit 11, a pull-up circuit 21, two pull-down circuits 31 and 32, and a compensation circuit 41. The first and third embodiments of the present invention have similar structures, but the shift register unit SR(n) of the third embodiment further includes the pull-down circuit 32. The pull-down circuit 32 includes transistor switches T6 and T7. The transistor switch T6, having a gate coupled to the clock generator 220 for receiving the clock signal CLK2, a drain coupled to the output end OUT(n) and a source coupled to the low level bias voltage VSS, can control the signal transmission path between the low level bias voltage VSS and the output end OUT(n) according to the voltage level of the clock signal CLK2. The transistor switch T7, having a gate coupled to the clock generator 220 for receiving the clock signal CLK3, a drain coupled to the output end OUT(n) and a source coupled to the low level bias voltage VSS, can control the signal transmission path between the low level bias voltage VSS and the output end OUT(n) according to the clock signal CLK3. The operation of the third embodiment can also be illustrated by the timing diagram in FIG. 6. Meanwhile, the third embodiment of the present invention further maintains the voltage level of the output end OUT(n) using the pull-down circuit 32, such as maintaining the voltage level of the output end OUT (n) at the low level VSS when the clock signals CLK2 and CLK3 are at high level.

Figure 9:
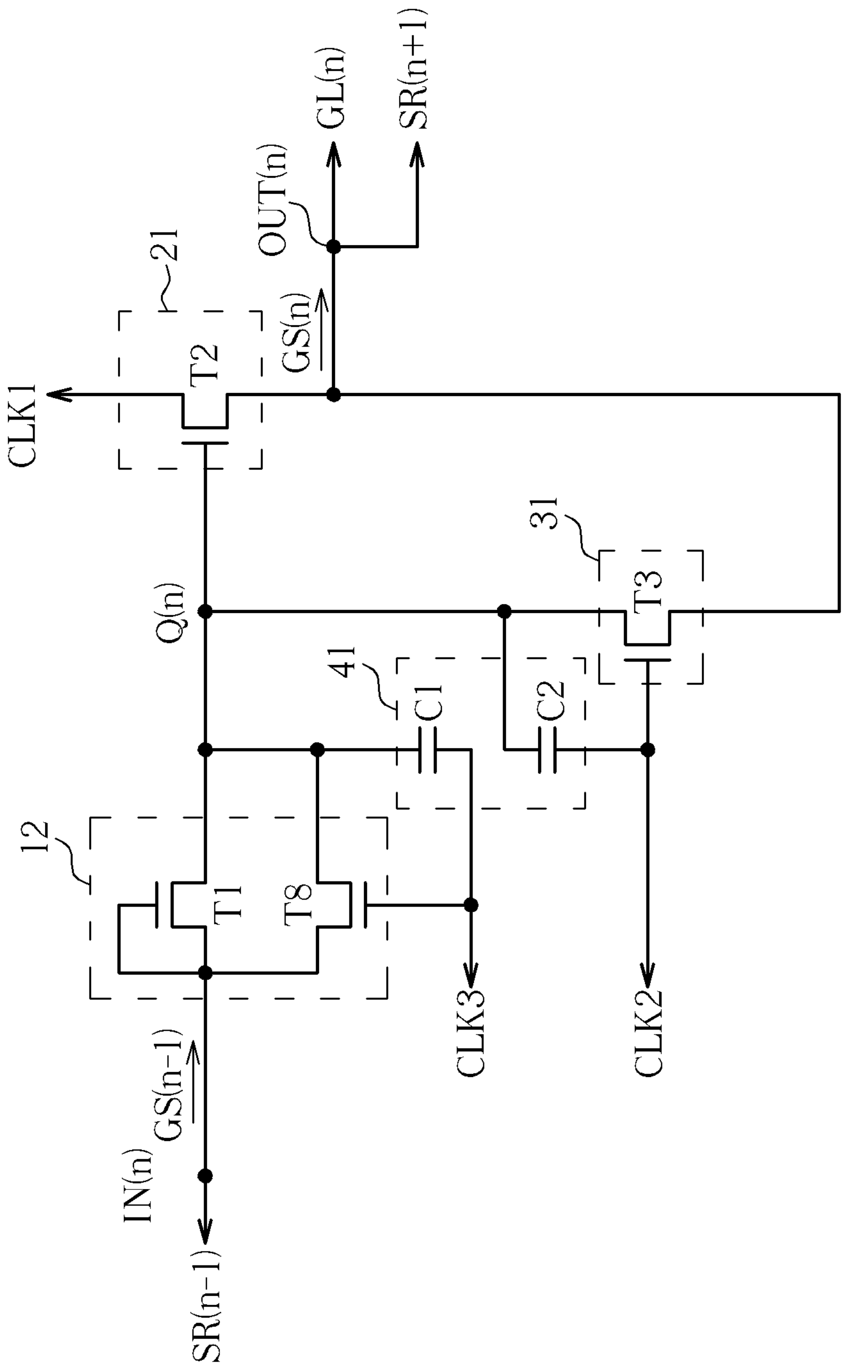
FIG. 9 is a diagram illustrating an nth-stage shift register unit according to a fourth embodiment of the present invention.

Reference is made to FIG. 9 for a diagram illustrating an nth-stage shift register unit SR(n) according to a fourth embodiment of the present invention. In the fourth embodiment of the present invention, the shift register unit SR(n) includes an input end IN(n), an output end OUT(n), an input circuit 12, a pull-up circuit 21, a pull-down circuit 31 and a compensation circuit 41. The first and fourth embodiments of the present invention have similar structures, but the input circuit 12 of the fourth embodiment includes two transistor switches T1 and T8. The transistor switch T1, having a gate and a drain coupled to the input end IN(n) for receiving the gate driving signal GS(n−1) and a source coupled to the node Q(n), can control the signal transmission path between the input end IN(n) and the node Q(n) according to the gate driving signal GS(n−1). The transistor switch T8, having a gate coupled to the clock generator 220 for receiving the clock signal CLK3, a drain coupled to the input end IN(n) for receiving the gate driving signal GS(n−1) and a source coupled to the node Q(n), can control the signal transmission path between the input end IN(n) and the node Q(n) according to the clock signal CLK3. The operation of the fourth embodiment can also be illustrated by the timing diagram in FIG. 6. Meanwhile, the fourth embodiment of the present invention further maintains the voltage level of the node Q(n) using the transistor switch T8 of the input circuit 12, such as maintaining the voltage level of the node Q(n) at the voltage level of the gate driving signal GS(n−1) when the clock signal CLK3 is at high level.

Figure 10:
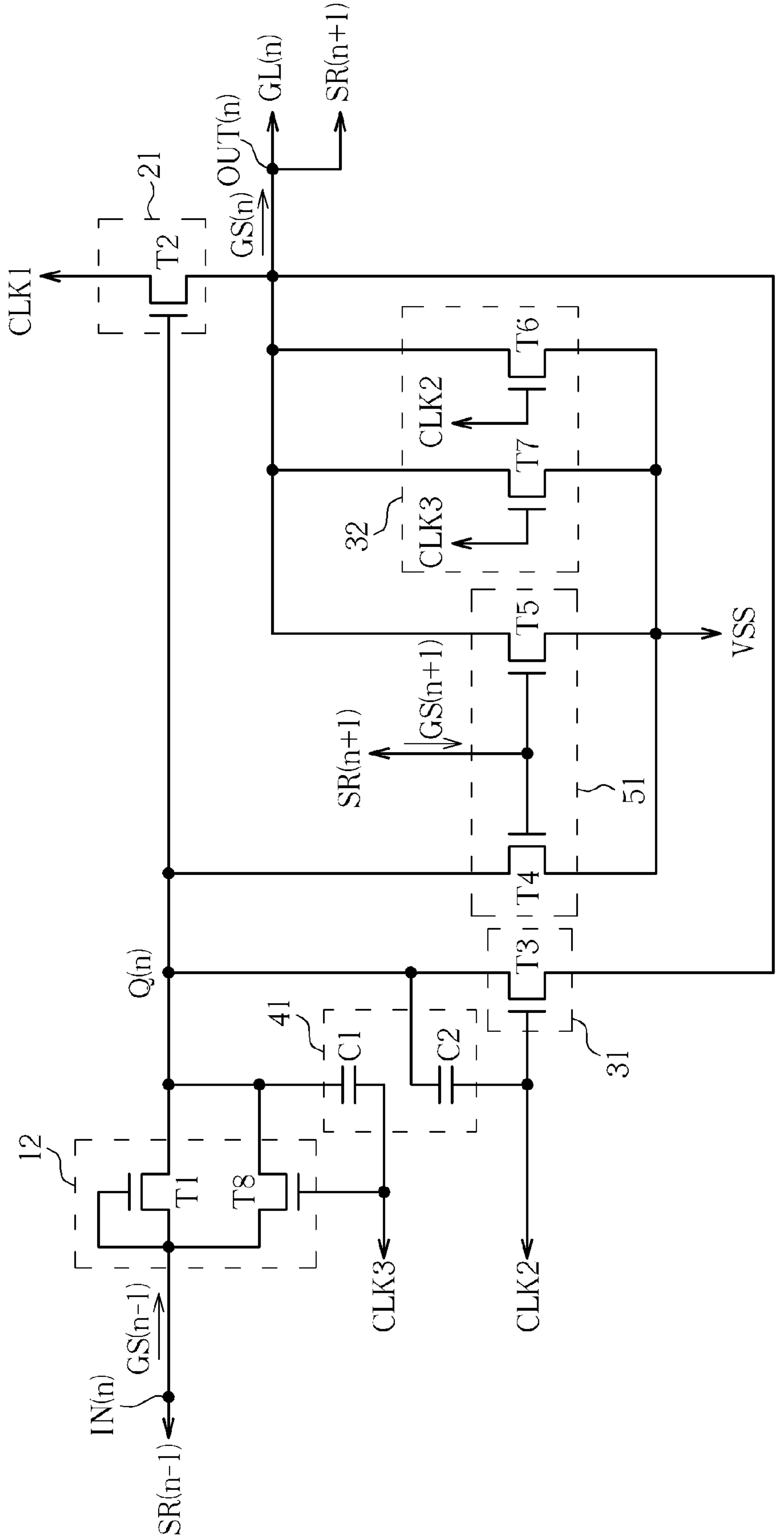
FIG. 10 is a diagram illustrating an nth-stage shift register unit according to a fifth embodiment of the present invention.

Reference is made to FIG. 10 for a diagram illustrating an nth-stage shift register unit SR(n) according to a fifth embodiment of the present invention. In the fifth embodiment of the present invention, the shift register unit SR(n) includes an input end IN(n), an output end OUT(n), an input circuit 12, a pull-up circuit 21, two pull-down circuits 31 and 32, a compensation circuit 41, and a pre-pull-down circuit 51. The first and fifth embodiments of the present invention have similar structures, but the shift register unit SR(n) of the fifth embodiment further includes the pull-down circuit 32 and the pre-pull-down circuit 51, and the input circuit 12 of the fifth embodiment includes two transistor switches T1 and T8. The structures of the input circuit 12, the pull-down circuit 32 and the pre-pull-down circuit 51 can be illustrated in FIGS. 7-9. The operation of the fifth embodiment can also be illustrated by the timing diagram in FIG. 6. Meanwhile, the fifth embodiment of the present invention further maintains the voltage levels of the node Q(n) and the output end OUT(n) using the pre-pull-down circuit 51, further maintains the voltage level of the output end OUT(n) using the pull-down circuit 32, and further maintains the voltage level of the node Q(n) using the transistor switch T8 of the input circuit 12.

Figure 11:
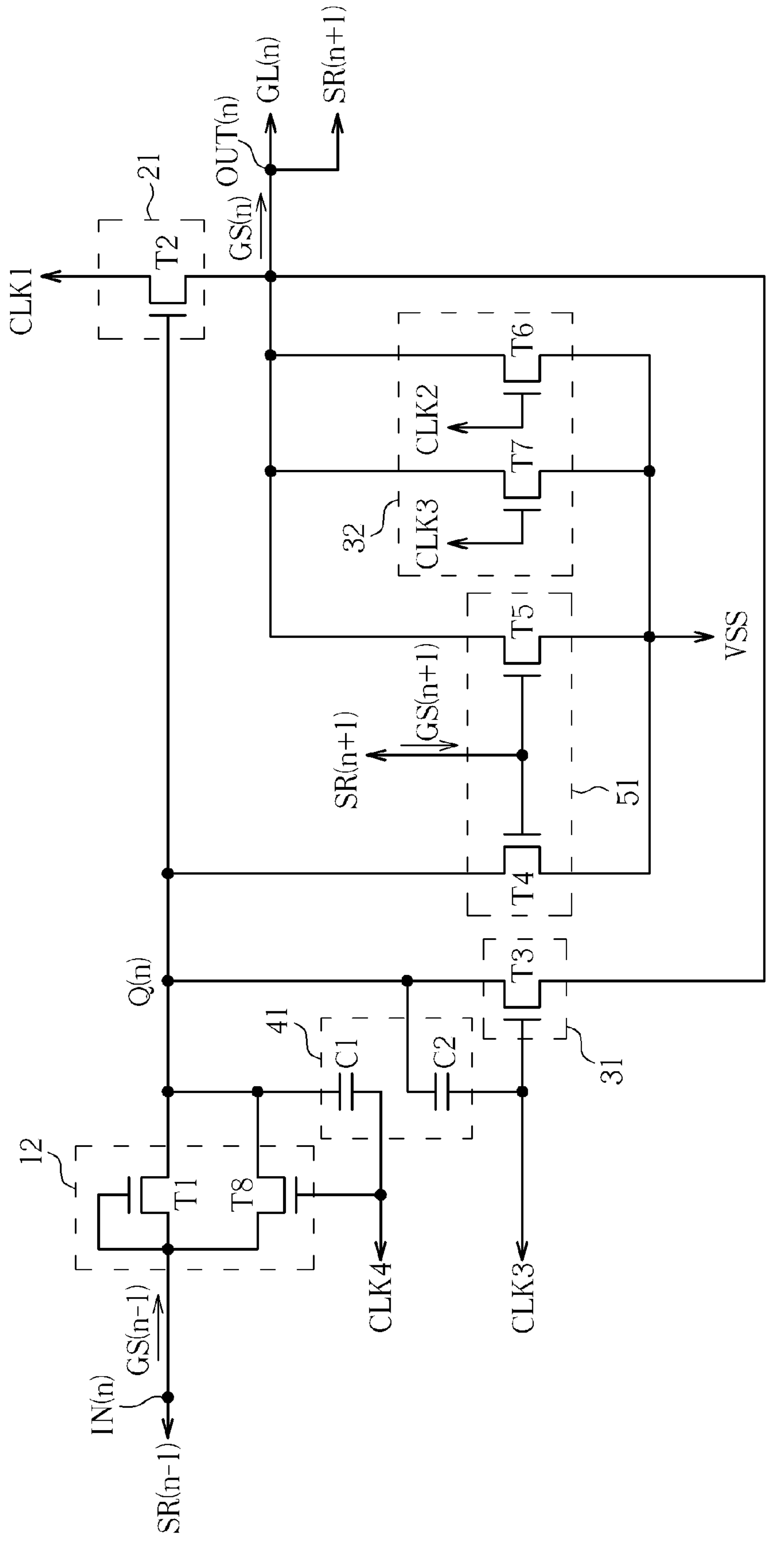
FIG. 11 is a diagram illustrating an nth-stage shift register unit according to a sixth embodiment of the present invention.

Reference is made to FIG. 11 for a diagram illustrating an nth-stage shift register unit SR(n) according to a sixth embodiment of the present invention. The fifth and sixth embodiments of the present invention have similar structures, but four clock signals CLK1-CLK4 are used in the sixth embodiment for driving the shift register unit SR(n). The input circuit 12 operates in response to the clock signal CLK4, the pull-up circuit 21 operates in response to the clock signal CLK1, the pull-down circuit 32 operates in response to the clock signals CLK2 and CLK3, and the pull-down circuit 31 operates in response to the clock signal CLK3. The sixth embodiment of the present invention also maintains the voltage level of the node Q(n) using the compensation circuit 41.

Figure 12:
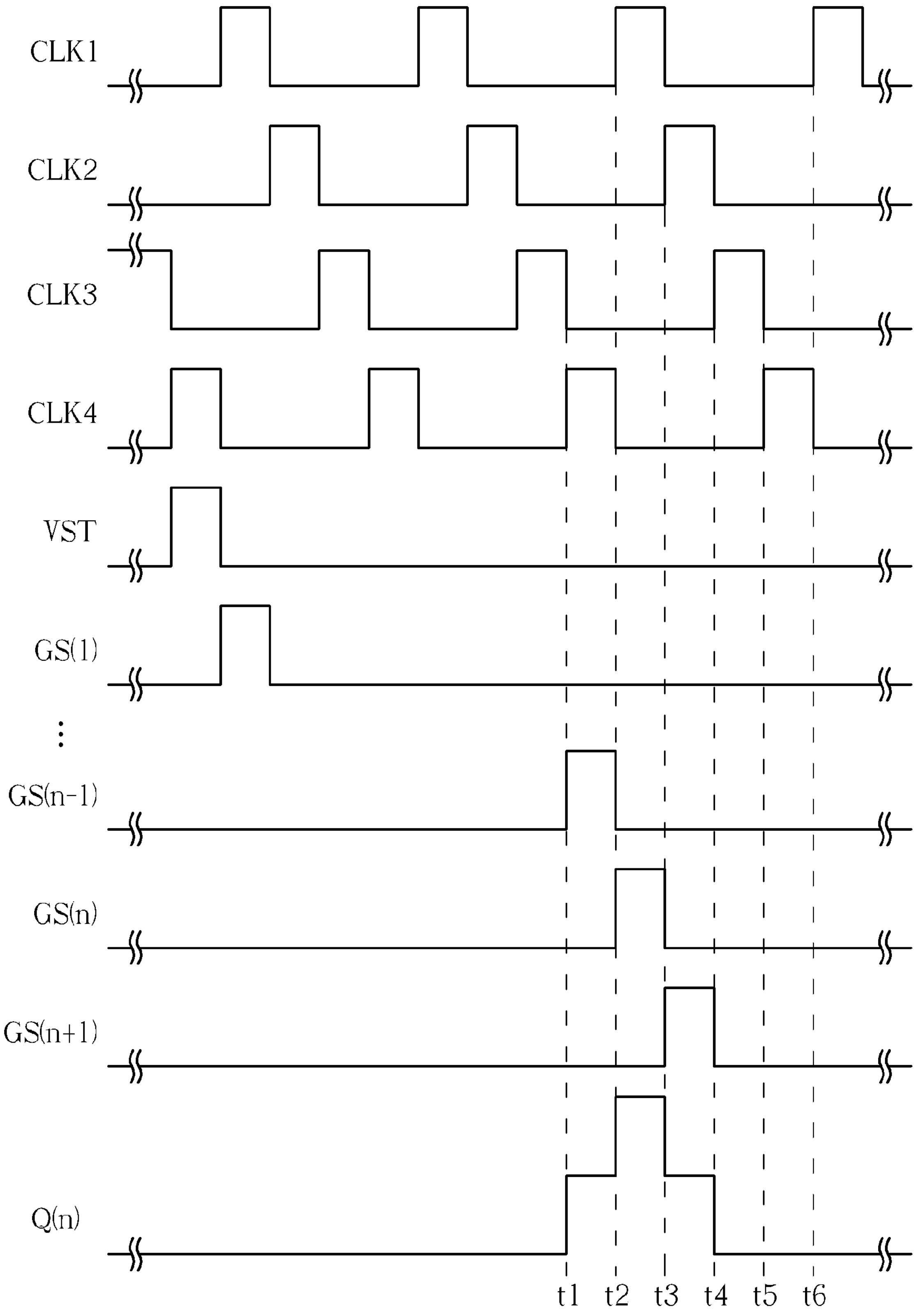
FIG. 12 is a timing diagram illustrating the operation of the LCD device according to the present invention.
Figure 13A:
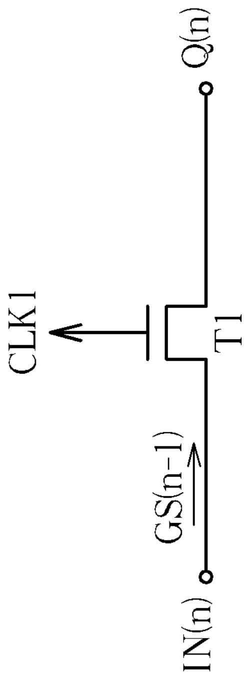
FIGS. 13*a*-13*d* are diagrams illustrating the configurations of the input circuit according to the present invention.
Figure 13B:
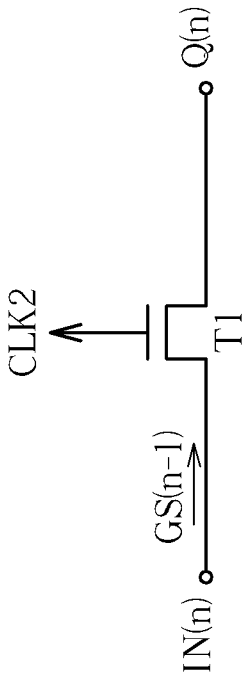
Figure 13C:
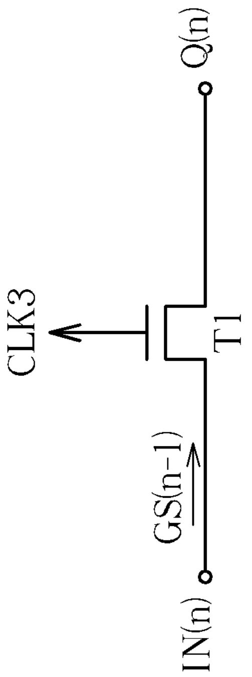
Figure 13D:
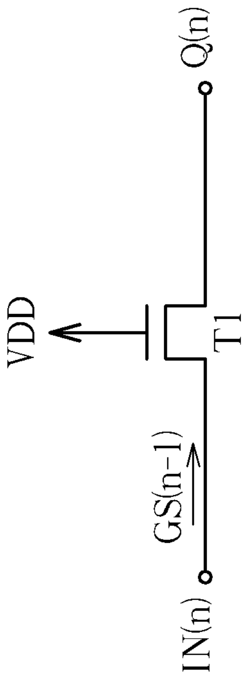

Reference is made to FIG. 12 for a timing diagram illustrating the operation of the LCD device 200 according to the sixth embodiment of the present invention. In the sixth embodiment of the present invention, four clock signals CLK1-CLK4 are used for driving each shift register unit. The duty cycles of the clock signals CLK1-CLK4 do not exceed ¼. Each of the clock signals CLK1-CLK4 and the start pulse signal remain at high level for the same length of time in each period. The LCD device 200 according to sixth embodiment of the present invention performs pull-up operations when the clock signal CLK1, CLK2 or CLK4 is at high level. For example, between t1 and t2, the clock signals CLK1-CLK3 are at low level, while the clock signal CLK4 and the gate driving signal GS(n−1) are at high level. The transistor switches T1 and T6 are thus turned on and the node Q(n) is pulled up to a high level, thereby turning on the transistor switch T2. At t2, the clock signal CLK1 switches from low level to high level, thereby turning on the transistor switch T2 for providing the gate driving signal GS(n) with high level between t2 and t3 (when the clock signal CLK1 is at high level). At t3, the clock signal CLK2 switches from low level to high level, thereby turning on the transistor switch T6 for pulling down the voltage level of the output end OUT(n).

Next, the LCD device 200 according to the sixth embodiment of the present invention performs pull-down operations when the clock signal CLK3 is at high level. For example, between t3 and t4, the clock signals CLK1, CLK3 and CK4 are at low level and the clock signal CLK2 is at high level, thereby turning off the transistor switch T1 and turning on the transistor switch T3. Therefore, the voltage levels of the node Q(n) and the output end OUT(n) are both kept at low level. After completing the pull-down operations, the present invention uses the compensation circuit 41 to offset the fluctuations of the node Q(N) caused by the variations in the clock signals, so that the node Q(n) can remain stably at low level. For example, at t4 when the clock signal CLK2 switches from high level to low level and the clock signal CLK3 switches from low level to high level, the capacitor C2 can compensate the voltage fluctuations at the node Q(n); at t5 when the clock signal CLK3 switches from high level to low level and the clock signal CLK4 switches from low level to high level, the capacitors C1 and C2 can compensate the voltage fluctuations at the node Q(n); at t6 when the clock signal CLK1 switches from low level to high level and the clock signal CLK4 switches from high level to low level, the capacitor C1 can compensate the voltage fluctuations at the node Q(n).

In the first through sixth embodiments of the present invention, the transistor switch T1 of the input circuits 11 and 12 can be diode-connected thin film transistors (TFTs) having the drain and the gate connected together. However, the transistor switch T1 of the input circuits 11 and 12 can also adopt other configurations, as shown in FIGS. 13*a*-13*d*. In the embodiments illustrated in FIGS. 13*a*-13*c*, the transistor switch T1 includes a drain coupled to the input end IN(n) for receiving the gate driving signal GS(n−1), a source coupled the node Q(n), and a gate coupled the clock generator 220 for receiving one of the clock signals CLK1-CLK3 which corresponds to the gate driving signal GS(n−1). In the embodiment illustrated in FIG. 13*d*, the transistor switch T1 includes a drain coupled to the input end IN(n) for receiving the gate driving signal GS(n−1), a source coupled the node Q(n), and a gate coupled the high level bias voltage VDD.

Three clock signals CLK1-CLK3 are used in the embodiments illustrated in FIGS. 5-10, and four clock signals CLK1-CLK4 are used in the embodiments illustrated in FIGS. 11 and 12. However, more clock signals can be used for driving each shift register unit in the present invention. The transistor switches T1-T8 can include TFTs or other devices providing similar functions. Since the voltage level of the node Q(n) is maintained using the compensation circuit 41, the coupling between the clock signals and the shift register units can be reduced. The present invention can thus provide an LCD device with simple structure and high resistance to noise.

Those skilled in the art will readily observe that numerous modifications and alterations of the device and method may be made while retaining the teachings of the invention.

What is claimed is:

1. A shift register comprising a plurality of shift register units coupled in series, each shift register unit comprising:
- an input end for receiving an input voltage;
- an output end for outputting an output voltage;
- a node;
- a pull-up circuit for providing the output voltage at the output end according to a first clock signal and a voltage level of the node;
- an input circuit for transmitting the input voltage to the node;
- a pre-pull-down circuit for providing a first voltage at the output end or at the node according to a feedback voltage;
- a first pull-down circuit for selectively connecting the node with the output end according to a second clock signal; and a compensation circuit coupled to the input circuit, the first pull-down circuit and the node for maintaining the voltage level of the node according to the second or a third clock signal.

2. The shift register of claim 1 wherein the pull-up circuit comprises a first switch having:

a first end for receiving the first clock signal;
a second end coupled to the output end; and
a control end coupled to the node.

3. The shift register of claim 1 wherein the input circuit comprises a first switch having:

a first end coupled to the input end;
a second end coupled to the node; and
a control end coupled to the input end.

4. The shift register of claim 3 wherein the input circuit further comprises a second switch having:

a first end coupled to the input end;
a second end coupled to the node; and
a control end for receiving the third clock signal.

5. The shift register of claim 4 wherein the compensation circuit comprises a first capacitor coupled between the node and the control end of the second switch for maintaining the voltage level of the node according to the third clock signal.

6. The shift register of claim 1 wherein the input circuit comprises a first switch having:

a first end coupled to the input end;
a second end coupled to the node; and
a control end for receiving the first clock signal, the second clock signal, or the third clock signal.

7. The shift register of claim 6 wherein the input circuit further comprises a second switch having:

a first end coupled to the input end;
a second end coupled to the node; and
a control end for receiving the third clock signal.

8. The shift register of claim 7 wherein the compensation circuit comprises a capacitor coupled between the node and the control end of the second switch for maintaining the voltage level of the node according to the third clock signal.

9. The shift register of claim 1 wherein the first pull-down circuit comprises a first switch having:

a first end coupled to the node;
a second end coupled to the output end; and
a control end for receiving the second clock signal.

10. The shift register of claim 9 wherein the compensation circuit comprises a capacitor coupled between the node and the control end of the first switch for maintaining the voltage level of the node according to the second clock signal.

11. The shift register of claim 1 further comprising a second pull-down circuit for providing a second voltage or a third voltage at the output end according to the second or the third clock signal.

12. The shift register of claim 11 wherein the second pull-down circuit comprises:

a first switch having:
a first end coupled to the output end;
a second end for receiving the second voltage; and
a control end for receiving the second clock signal; and
a second switch having:
a first end coupled to the output end;
a second end for receiving the third voltage; and
a control end for receiving the third clock signal.

13. The shift register of claim 12 wherein the voltage levels of the second and the third voltages are substantially identical.

14. The shift register of claim 1 wherein the feedback voltage is an output voltage generated by a next-stage shift register unit among the plurality of shift register units coupled in series.

15. The shift register of claim 1 wherein the pre-pull-down circuit comprises:

a first switch having:
a first end coupled to the output end;
a second end for receiving the first voltage; and
a control end for receiving the feedback voltage; and
a second switch having
a first end coupled to the node;
a second end for receiving the first voltage; and
a control end for receiving the feedback voltage.

16. The shift register of claim 1 wherein the compensation circuit comprises:

a first capacitor coupled to the input circuit and the node for maintaining the voltage level of the node according to the third clock signal; and
a second capacitor coupled to the first pull-down circuit and the node for maintaining the voltage level of the node according to the second clock signal.

17. The shift register of claim 1 wherein each clock signal remains at a low level longer than at a high level.

18. The shift register of claim 1 wherein a duty cycle of each clock signal is not greater than ⅓.

19. The shift register of claim 1 wherein each clock signal remains at a high level for a same length of time.

20. The shift register of claim 1 wherein the input voltage is an output voltage generated by a prior-stage shift register unit among the plurality of shift register units coupled in series.

21. A shift register comprising a plurality of shift register units coupled in series, each shift register unit comprising:

an input end for receiving an input voltage;
an output end for outputting an output voltage;
a node;
a pull-up circuit for providing the output voltage at the output end according to a first clock signal and a voltage level of the node;
an input circuit for transmitting the input voltage to the node;
a first pull-down circuit for selectively connecting the node with the output end according to a second clock signal; and
a compensation circuit coupled to the input circuit, the first pull-down circuit and the node for maintaining the voltage level of the node according to the second clock signal or a third clock signal, the compensation circuit comprising:
a first capacitor coupled to the input circuit and the node for maintaining the voltage level of the node according to the third clock signal; and
a second capacitor coupled to the first pull-down circuit and the node for maintaining the voltage level of the node according to the second clock signal.

* * * * *